No. 650,262. Patented May 22, 1900.
C. P. MORRISON.
BISCUIT ROLLER.
(Application filed Mar. 6, 1900.)
(No Model.)
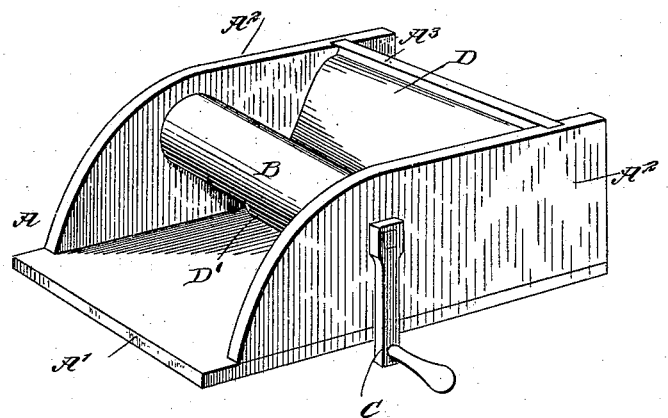
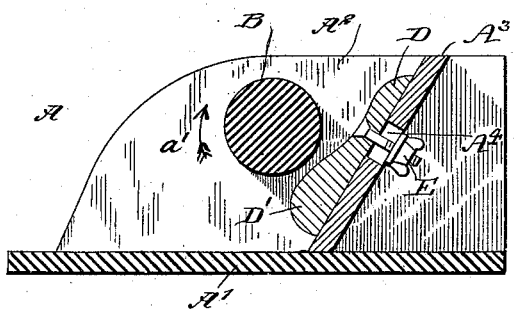

UNITED STATES PATENT OFFICE.

CAROLINE PUTNAM MORRISON, OF CHATTANOOGA, TENNESSEE.

BISCUIT-ROLLER.

SPECIFICATION forming part of Letters Patent No. 650,262, dated May 22, 1900.

Application filed March 6, 1900. Serial No. 7,521. (No model.)

*To all whom it may concern:*

Be it known that I, CAROLINE PUTNAM MORRISON, a citizen of the United States, and a resident of Chattanooga, in the county of Hamilton and State of Tennessee, have invented certain new and useful Improvements in Biscuit-Rollers, of which the following is a full, clear, and exact description.

The invention relates to dough-kneading machines; and its object is to provide a new and improved biscuit-roller more especially designed for working dough used to make beaten biscuit, the roller being simple and durable in construction and arranged to insure a thorough grinding of the dough, to cause the same to be thoroughly beaten, and requiring no baking-powder, soda, or other substances, and at the same time producing a healthful delightful biscuit.

The invention consists of novel features and parts and combinations of the same, as will be fully described hereinafter, and then pointed out in the claims.

A practical embodiment of the invention is represented in the accompanying drawings, forming a part of this specification, in which similar characters of reference indicate corresponding parts in both views.

Figure 1 is a perspective view of the improvement, and Fig. 2 is a sectional side elevation of the same.

The improved biscuit-roller has a box A, open at the top and front, and formed with a bottom A', sides $A^2$, and a forwardly and downwardly inclined back $A^3$, as is plainly shown in Fig. 2. In the sides $A^2$ is journaled a roller B, carrying on one end a crank-arm C, adapted to be taken hold of by the operator for turning the roller B.

Adjacent to the roller B and located on the inclined back $A^3$ is arranged a pressure-bar or breastplate D, adapted to be secured by a bolt E to the back $A^3$, the bolt extending through an elongated slot $A^4$ in the back $A^3$ to allow of moving the pressure-bar or breastplate up or down on the back $A^3$. The front face of the pressure-bar or breastplate D is of ogee form, as is plainly shown in Fig. 2, the belly or lower convex portion D' being close to the peripheral surface of the roller B, so as to leave a comparatively-small space between the breastplate and the roller B.

The breastplate D forms a friction-bar for the dough, so that when the roller B is rotated the dough is forced against the plate D and is thereby broken, thus producing that consistency and texture in the dough which is requisite in the making of beaten biscuit.

When the device is used, the dough after being prepared by hand in the usual manner is placed in the top of the box at the roller and breastplate, and then the roller is turned in the direction of the arrow $a'$, so that the dough that clings to the roller is forced against the breastplate D and is thereby ground and crushed, especially that portion which passes through the narrow passage between the roller and the lower convex portion of the breastplate, it being understood that the dough that passes through the said passage and clings to the peripheral surface of the roller is carried around with the roller and back to the remaining portion of the dough to be again worked, as described, thus completely breaking the dough by crushing, grinding, and tearing the dough. This operation is continued until the dough is thoroughly kneaded, the full operation requiring from five to fifteen minutes, according to the nature of the dough under treatment and according to the rapidity with which the roller is turned. Should any part of the dough become detached from the roller after passing between the roller and the breastplate and drop into the bottom of the box, then such dough is returned by hand to the dough in the top of the box to be again subjected to the treatment above detailed. By the arrangement described the dough is effectively worked and not merely squeezed, as is the case with similar devices heretofore constructed.

By giving the breastplate D the undulated form mentioned, it is evident that the dough readily passes in a downward direction between the lower convex portion of the breastplate D and the roller B, for the purpose above stated; to knead, as nearly as possible, dough similar to the beaten dough made in the ordinary manner.

Dough treated by this machine becomes flaky and requires no baking-powder, soda, or other materials usually employed for causing the dough to rise, and at the same time dough treated by the machine can be cut into the desired shape and baked in the usual manner.

The device is very simple and durable in construction, is not liable to get out of order, and can easily be manipulated to produce the desired result.

The working face of the breastplate may be smooth, as shown, or corrugated or fluted transversely, if desired, the corrugations facilitating the breaking of the dough.

Having thus fully described my invention, I claim as new and desire to secure by Letters Patent—

1. A biscuit-roller, comprising a casing, a roller journaled in the casing, and a pressure-bar or breastplate held in said casing and extending in an inclined direction close to the peripheral surface of said roller, the face of the pressure-bar being undulated, substantially as shown and described.

2. A biscuit-roller, comprising a casing, a roller journaled in the casing, and a pressure-bar or breastplate held in the said casing and extending in an inclined direction close to the peripheral surface of the roller, the face of the breastplate being of ogee form, and the convex lower portion being next to the peripheral surface of the roller, substantially as shown and described.

3. A biscuit-roller, comprising a casing, a roller journaled in the casing, a pressure-bar or breastplate held in said casing and extending in an inclined direction close to the peripheral surface of the roller, the face of the breastplate being of ogee form, and the convex lower portion being next to the peripheral surface of the roller, and means, substantially as described, for adjustably securing said pressure-bar in place in the casing, as set forth.

In testimony whereof I have signed my name to this specification in the presence of two subscribing witnesses.

CAROLINE PUTNAM MORRISON.

Witnesses:
W. A. BIRD,
JNO. F. CARSON.